No. 694,342. Patented Mar. 4, 1902.
H. A. ADAMS.
VOTING MACHINE.
(Application filed May 13, 1901.)
(No Model.) 7 Sheets—Sheet 1.

Witnesses
Elmer Seavey

Inventor
Hugh A. Adams.
by
Attorney

No. 694,342. Patented Mar. 4, 1902.
H. A. ADAMS.
VOTING MACHINE.
(Application filed May 13, 1901.)
(No Model.) 7 Sheets—Sheet 2.

Witnesses
Elmer Seavey

Inventor
Hugh A. Adams.
by
Attorney

No. 694,342. Patented Mar. 4, 1902.
H. A. ADAMS.
VOTING MACHINE.
(Application filed May 13, 1901.)
(No Model.) 7 Sheets—Sheet 3.

Witnesses
Elmer Seavey
C. Hugh Duff

Inventor
Hugh A. Adams
by O. E. Duff
Attorney

No. 694,342. Patented Mar. 4, 1902.
H. A. ADAMS.
VOTING MACHINE.
(Application filed May 13, 1901.)
(No Model.) 7 Sheets—Sheet 4.

Witnesses
Elmer Seavey
C. Hugh Duff

Inventor
Hugh A. Adams.
by 
Attorney

THE NORRIS PETERS CO., PHOTO-LITHO., WASHINGTON, D. C.

No. 694,342. Patented Mar. 4, 1902.
H. A. ADAMS.
VOTING MACHINE.
(Application filed May 13, 1901.)
(No Model.) 7 Sheets—Sheet 5.

Witnesses
Elmer Seavey

Inventor
Hugh A. Adams.
by
Attorney

No. 694,342. Patented Mar. 4, 1902.
H. A. ADAMS.
VOTING MACHINE.
(Application filed May 13, 1901.)
(No Model.) 7 Sheets—Sheet 6.

Witnesses
Elmer Leavey

Inventor
Hugh A. Adams.
by
Attorney

No. 694,342. Patented Mar. 4, 1902.
H. A. ADAMS.
VOTING MACHINE.
(Application filed May 13, 1901.)
(No Model.) 7 Sheets—Sheet 7.

Witnesses
Elmer Seavey

Inventor
Hugh A. Adams.
by
Attorney

UNITED STATES PATENT OFFICE.

HUGH A. ADAMS, OF WABASH, INDIANA.

VOTING-MACHINE.

SPECIFICATION forming part of Letters Patent No. 694,342, dated March 4, 1902.

Application filed May 13, 1901. Serial No. 60,046. (No model.)

*To all whom it may concern:*

Be it known that I, HUGH A. ADAMS, a citizen of the United States, residing at the city of Wabash, in the county of Wabash and State of Indiana, have invented certain new and useful Improvements in Voting-Machines; and I do hereby declare the following to be a full, clear, and exact description of the invention, such as will enable others skilled in the art to which it appertains to make and use the same.

My invention relates to "voting-machines," and has for its object to provide a device of the class which will automatically count the votes cast for the several candidates and at the same time register the sum-total of all the votes.

A further object of my invention is to provide a voting-machine upon which a "split ticket" may be voted.

A further object of my invention is to provide an automatic locking means whereby the voter can only vote for one candidate for each office.

A further object of my invention is to provide a voting-machine whereby a voter in a booth does not register his own vote, but which is registered automatically by the assistance of the election judges after the voter emerges from the booth.

A further object of my invention is to provide a voting-machine upon which the votes are registered by the election judges in full view of and with the assistance of the voter himself, thus precluding any possibility of fraud and insuring an honest count of every vote cast.

With all these objects in view my invention consists in the novel arrangement and construction of a voting-machine.

My invention also consists in the novel method of registering a vote after it is cast.

My invention also consists in the novel manner of registering the sum-total of the votes cast.

My invention also consists in certain other novel features of construction and in combination of parts, which will be hereinafter fully described and afterward specifically pointed out in the appended claims.

Referring to the accompanying drawings, which form a part of this specification,
Fig. 3 is a side elevation taken from the right of Fig. 1.
Fig. 14 is a rear view of my voting-machine, showing disks removed and illustrating my automatic locking device in elevation and in section.
Fig. 15 is a side elevation of my vote-registering key in a normal position.
Fig. 16 is a view of the same, showing key depressed.
Fig. 17 is a vertical section along the line 17 17 of Fig. 16, showing the release-key of the vote-registering key.

Like numerals of reference indicate the same parts throughout the several figures, in which—
1 is the front of my voting-machine, and 2 the back thereof.

3 indicate the handles of my voting-key-operating levers 4, which are secured to the back 2.
5 indicate the vertically-sliding key-operating-bars secured on the inner side of the front 1 in guides 6, said bars being connected to the top 7 by a spiral spring 8 and are provided with laterally-projecting pins 9, directly under the voting-key-operating levers 4. Said vertically-sliding bars are cut out at certain points, forming inclined planes 11 and horizontal stops 12.

13 indicate the voting-keys, which extend horizontally through the machine and are normally held in an operative position by a spiral spring 14, secured to the inside of the front 1. The bottom of said keys are provided with ratchet-teeth 15 for a purpose which will be hereinafter fully described. Secured to the side of said keys is a downwardly-beveled projection 16, which engages the inclined plane 11 of the vertically-sliding key-operating bars 5 and engages the horizontal stop in said bars. The rear end of said voting-keys are threaded and are connected to the automatic registering-disks in a manner which will be hereinafter fully described. Secured to the front 1 and back 2 on both sides of the machine are horizontal guides 17, within which the horizontal sliding release-bars 18 are slidingly secured under the voting-keys 13. Said release-bars are provided with short uprights 19, which carry a horizontal rod 20, on which the pawls 21 are secured, said pawls being held upright by a small spiral spring 22, fastened in the top of the release-bars 18.

Secured in the top and bottom of the machine is a vertically eccentrically pivoted flat bar 23, which is connected to the release-bars by means of links 24, pivoted to said release-bars.

Connecting with the bottom release-bar 18 is the release-bar-operating rod 25, which extends some distance from the machine proper, it being my intention to make this rod long enough to extend some distance outside the private booth, within which the machine is placed, to the election judges. Secured to the end of this rod is a key 26, similar to the voting-keys 13, having a threaded end which is connected to the automatically poll-vote registering disks 27. The bottom of this release-bar-operating key 26 is also provided with ratchet-teeth 28, which engage with a pawl 29, secured in an upright position on a small release-key 30, said pawl having a spring 31 and being secured in a manner similar to the pawls 21 on the release-bars 18.

As aforesaid, the voting-keys extend through the machine and project a short distance past back 2.

I provide the threaded ends 32 with a nut 33 and a jam-nut 34, being enabled to set aside nut 33 at any point along said threaded ends. Said threaded ends are then passed through the slot 35 of my disk-operating lever 36, which is journaled on a shaft 37, said shaft being held in the frames 38, which is secured to the back of the machine.

In the drawings I show my registering-disks in sets of threes and will likewise describe them, although I consider myself entitled to use any number of disks in one set, such additions being a matter of construction which must necessarily be varied to meet the requirements of the machine.

The first or units disk 39 revolves on the shaft 37 just described. Secured on the right of said disk or integral therewith is a small toothed wheel 40, the teeth 41 of which taper to a point. Secured on the right of said toothed wheel 40 or integral therewith is a ratchet-wheel 42 of the same diameter. The pawl 43 on the disk-operating lever 36 engages said ratchet-wheel and turns the same. As aforesaid, the disk-operating lever 36 is secured to the voting-key 13. Consequently when said key is pushed it turns the key-operating lever sufficiently far to cause the pawl 43, carried thereon, to turn the ratchet-wheel 42 one tooth. This causes the spring-arm stop 44, which is pivoted on a smaller shaft 45 below the shaft 37, to ride one tooth of the toothed wheel 40 and the projection 46 thereon to drop in front of the succeeding tooth, thus acting as a stop and insuring a uniform revolution of one tooth at every operation and preventing the disk from revolving backward with the return of the disk-operating lever and pawl to its normal position.

Secured on the inside of the units-disk 39 is a pawl 47 and a spring 48 on top of the same. Secured directly in rear of said pawl 47 is a horizontal projecting pin 49, the purpose and function of which will be now explained.

Figures 1, 18, 19, 20, 21:
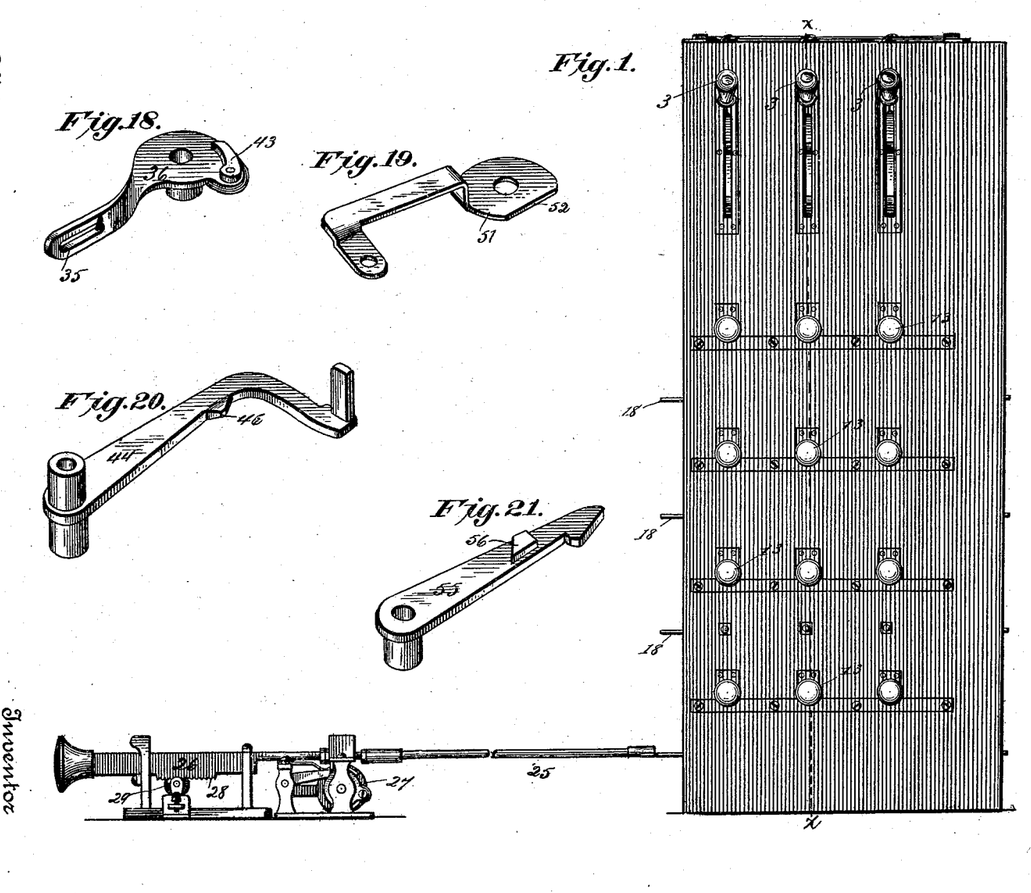
Figure 1 is a front elevation of my voting-machine in an operative position.
Fig. 18 is a perspective view of my disk-operating lever and pawl.
Fig. 19 is a perspective view showing my disk-dividing plate.
Fig. 20 is a perspective view of my spring-arm stop.
Fig. 21 is a perspective view of my escapement-arm.
Figures 2, 13, 22:
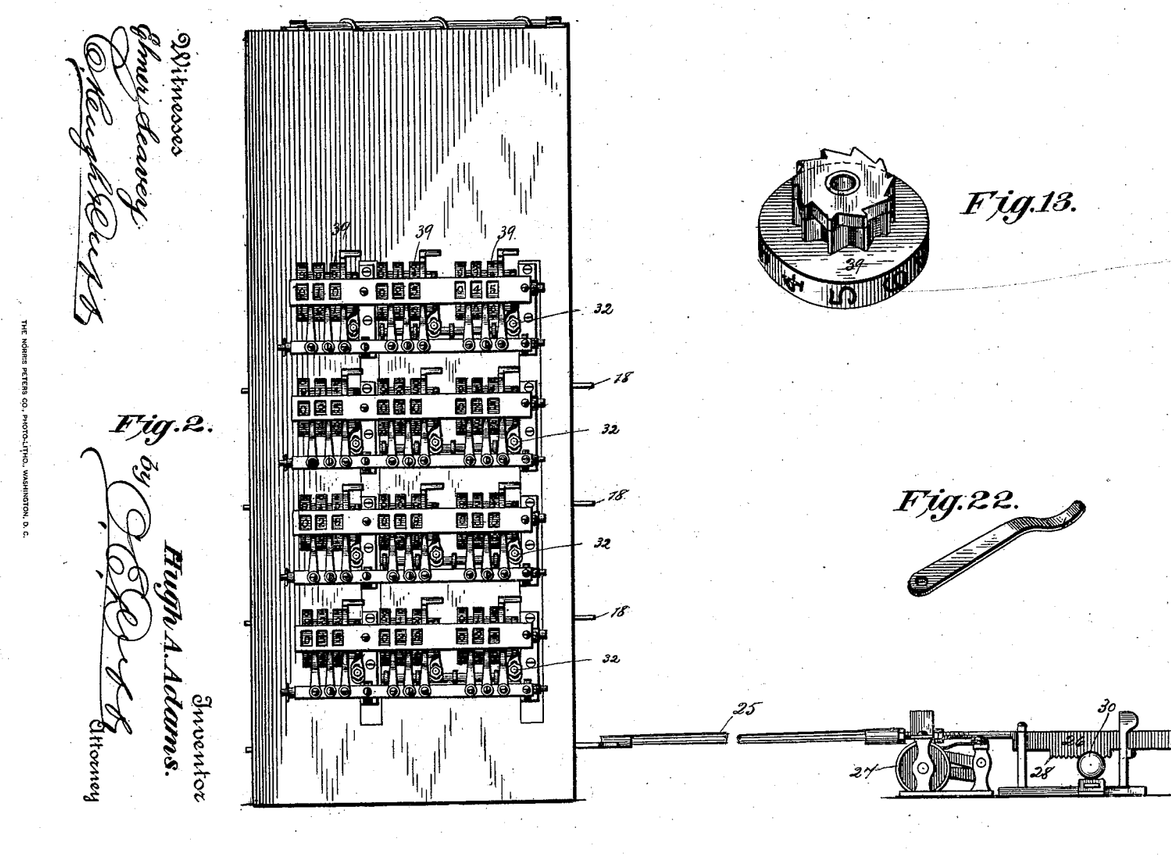
Fig. 2 is a rear view of the same.
Fig. 13 is a perspective view taken from the right of one of my disks.
Fig. 22 is a perspective view of one of the springs which hold my escapement-arm in position.
Figure 3:
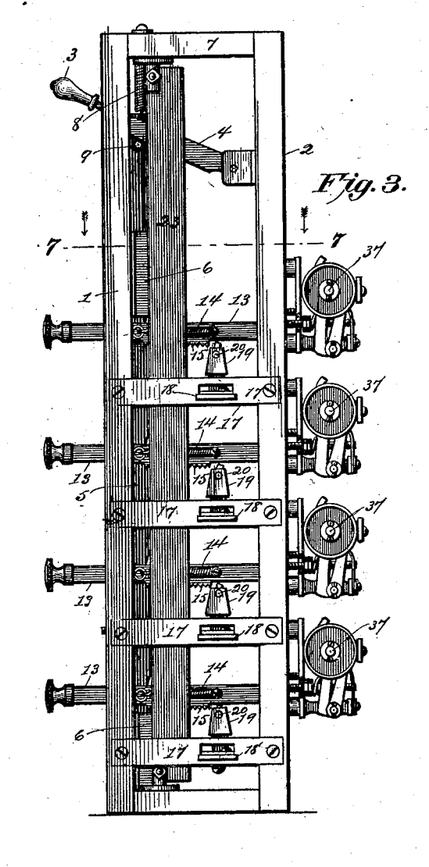
Figure 4:
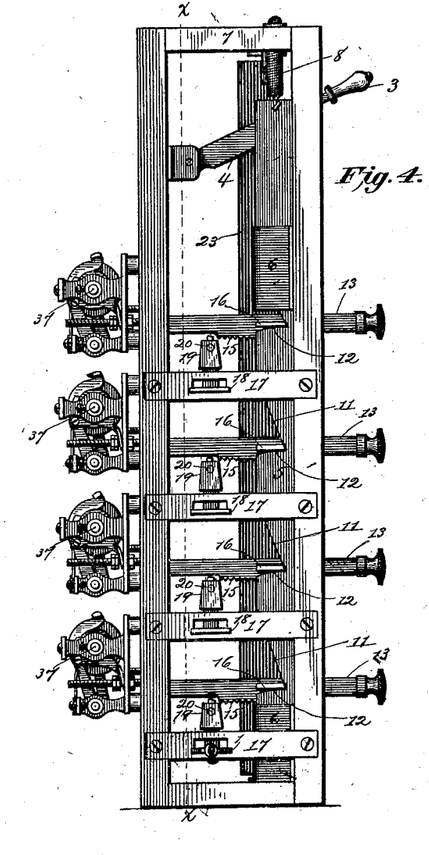
Fig. 4 is a side elevation taken from the left of Fig. 1.
Figure 5:
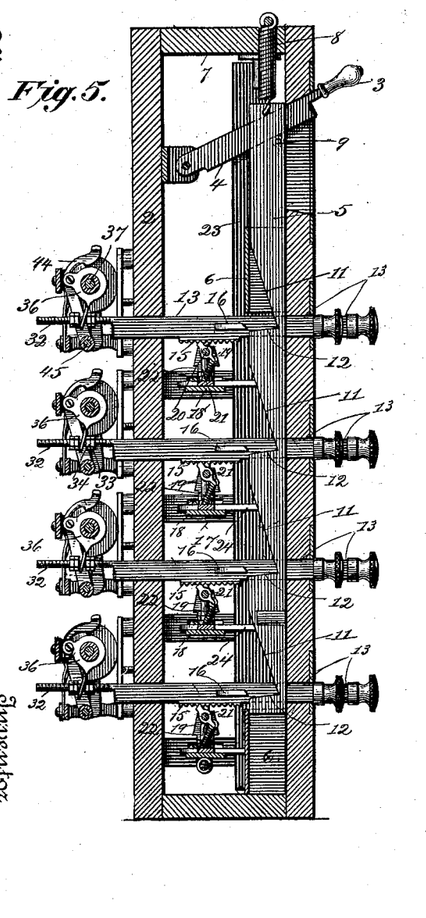
Fig. 5 is a vertical section along the lines $xx$ of Fig. 1.
Figure 6:
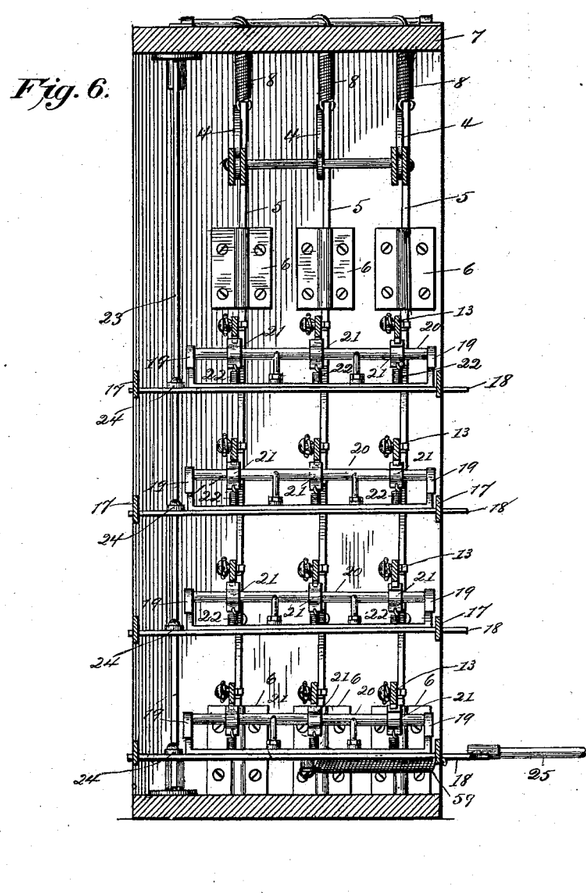
Fig. 6 is a vertical section along the lines $xx$ of Fig. 4.
Figure 7:
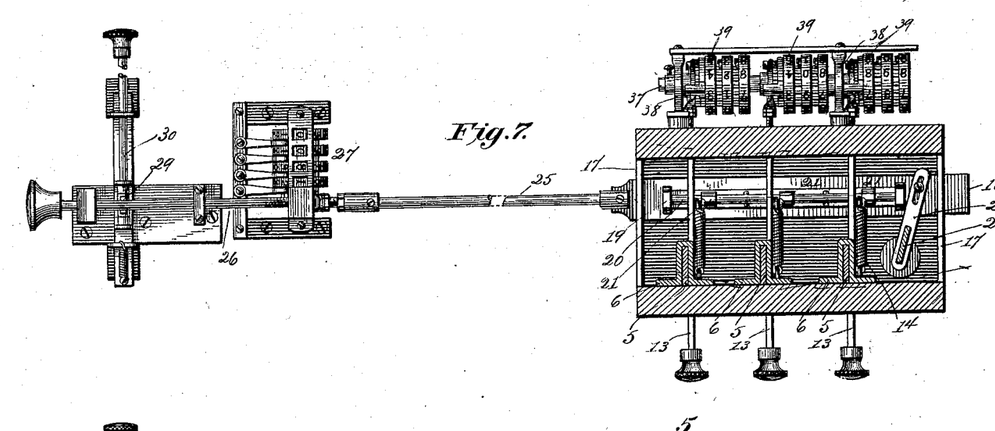
Fig. 7 is a cross-section along the lines 7 7 of Fig. 3.
Figure 8:
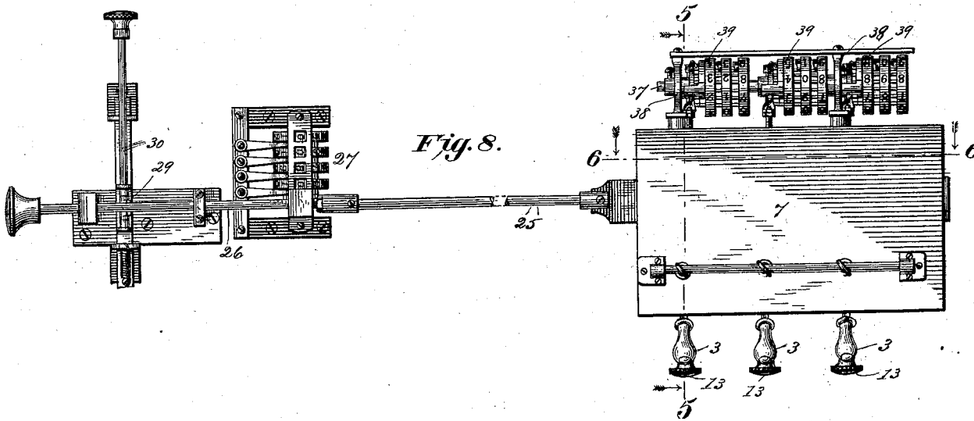
Fig. 8 is a top plan view of my voting-machine.
Figures 9, 11:
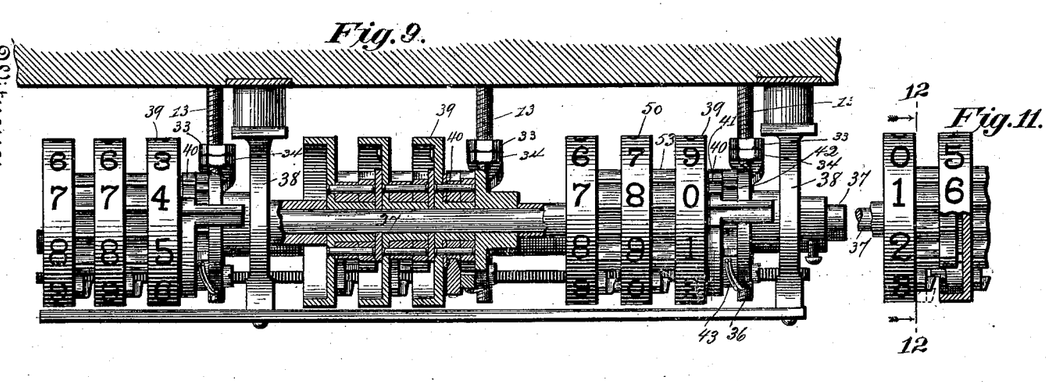
Fig. 9 is a top plan view of my automatic disks, the central group being shown in section.
Fig. 11 is a detail view of two of my disks, a portion being broken away to show the interior.
Figure 10:
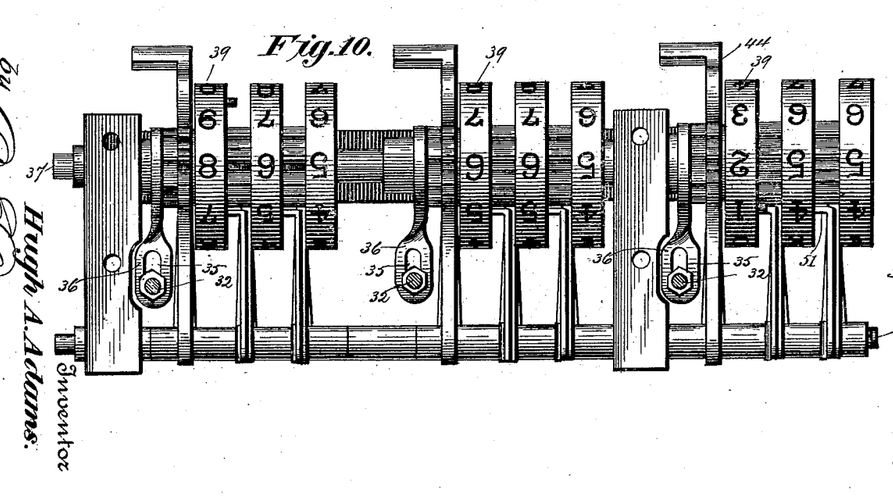
Fig. 10 is a rear view of the same.
Figure 12:
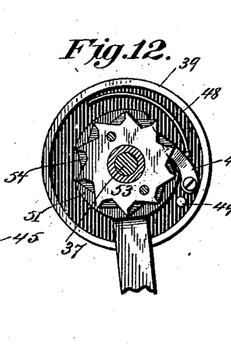
Fig. 12 is a vertical section taken on the line 12 12 of Fig. 11.
Figures 14, 15, 16, 17:
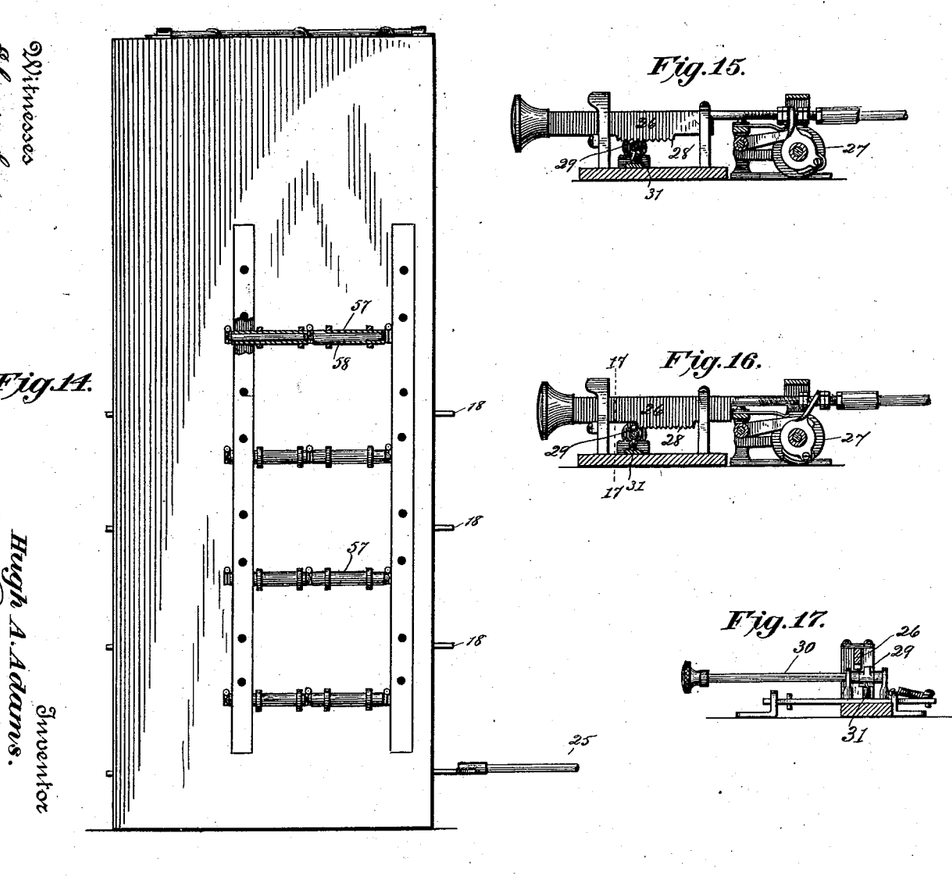

The second or disk registering tens 50 is journaled on the shaft 51 on the left of the units or first disk 39, a disk-dividing plate 51 being interposed between the two, said disk-dividing plate being secured also on the shaft 45 below the shaft 37. It will be observed by referring to Fig. 19 that a small portion of the circular plate 51 is cut away, forming a horizontal top 52 when the plate is in an operative position.

To return now to the second or disk registering tens, said disk is provided on its right or integral therewith with two ratchet-wheels 53 and 54 of like diameter and of the same diameter as the ratchet-wheel 42 on the first or units disk. Said ratchet-wheels 53 and 54 have their ratchet-teeth oppositely inclined, the ratchet-wheel 54 having formed to engage the pawl 47 on the inner side of the first or units disk 39 when said disk is revolving in the direction of the hands of a watch. The disk-dividing plate 51 has substantially the same diameter as said ratchet-wheels 53 and 54, and the pawl 47, secured on the inner side of the first or units disk 39, is placed so that it will rest on the periphery of said plate 51 and travel thereon. When, however, said pawl 47 reaches the flat top of said plate, it tends to follow said flat top by reason of the spring 48 pushing against said pawl. This, however, drops said pawl low enough to engage a ratchet-tooth on the wheel 54, and at the next turn of the units-disk 39 and pawl 47 said ratchet-wheel 54 and second disk is turned one tooth, which is equivalent to one number on the periphery thereof, there being as many numbers thereon as there are teeth on the ratchet-wheels, which is from one to ten. At the same time the pawl 47 engages the ratchet-wheel 54 the horizontally-projecting pin 49 engages the escapement-arm 55, which is pivoted on the shaft 45, and lifts it out of engagement with the ratchet-wheel 53, thereby allowing the second disk 50 to revolve one tooth with the first or units disk. It will be observed by referring to Fig. 21 that the escapement-arm 55 is provided on its side with a small projection 56, the bottom of which is flat and forms a bearing for the pin 49 on the inner side of the first or units disk. It is against this bearing that said pin strikes, which raises the escapement-arm.

The first or units disk 39 must revolve a full revolution (which is equal to ten units) before the second disk 50 is engaged and turned, as described.

The second or disk registering the tens is provided with a pawl on its inner side identical with pawl 47 and another disk-dividing plate between it and the third or disk registering the hundreds. The third disk is turned by the second precisely as the second is turned by the first. Consequently any further description would be unnecessary and only repetition. Every revolution of the second disk turns the third one tooth, and one revolution of said second disk registers tens or one hundred on the third disk. It must be understood that any number of these disks can be set together, and they would register as high as is consistent with the requirements of the machine, some very populous districts requiring a machine with more disks than smaller districts would require. It must be also understood that the set of disks just described are duplicated for every candidate and for every office.

Having now described the manner of registering the votes for the several candidates, I will now describe my method of registering the total number of ballots cast, or, in other words, the entire poll-vote. I will first describe the several parts and then the operation.

As aforesaid, the voting-machine is placed in a voting-booth, the release-bar-operating rod 25 extending through the booth and in plain view of the election judges. When, therefore, a voter has pushed in the voting-keys which registered a vote for his candidates, he steps out in the presence of the election judges and registers his poll-vote in the manner described. As aforesaid, the release-bar-operating rod 25 is connected to a key 26 similar to the voting-keys 13 and is also connected to a disk-operating lever 36 identical with the disks-operating lever 36, already described. The bottom edge of said key 26 is formed with ratchet-teeth 28 and are adapted to engage with a pawl 29, secured to the release-key 30. Said teeth and pawl are so placed that the release-bar-operating rod cannot be pushed while the pawl 29 is in engagement with the teeth 28. The voter therefore steps to the key 26, attached to the release-bar-operating rod 25, and the election judge pushes the release-key 30. This takes the pawl 29 out of engagement with the ratchet-teeth 28 of the key 26. The voter is then able to push said key 26 and release-bar-operating rod 25, which operates the release-bars 18 in the machine and allowing the voting-keys 13 to spring back to their normal position. As aforesaid, the release-bar-operating rod 25 is connected to the disk-operating lever 36 of the poll-vote-registering disks 27, and as said releasing-bar-operating rod is pushed it turns the units-disk one tooth or one number, thus registering one poll-vote.

I have endeavored to construct a voting-machine which will, as far as possible, insure fair voting, and in order to accomplish this I have arranged a locking device which allows but one voting-key 13 to be operated for each office, and which therefore precludes a double vote or a vote for two candidates for the same office.

In the back 2 of the machine I have placed a series of cylinders 57 in line with the voting-keys 13. Within said cylinders I arrange a sliding pin or rod 58, loosely held therein. The distance between all of said pins in each line is equal to the cross-section of one of the voting-keys 13. Consequently when one voting-key 13 in that line passes between said pins 58 it causes the pins 58 on either side to touch, and thus close the openings through which the voting-keys 13 in the same line pass. This is a very simple locking device, but is extremely efficient and insures an honest vote.

Having thus described the several parts of my invention, its operation is as follows: As aforesaid, the voting-machine is placed in a booth similar to the Australian ballot system booth. I prefer to number the buttons on voting-keys, so that the voter can easily distinguish those representing his candidates, the same being understood before entering the booth, and full directions placed in a prominent place thereof. The keys representing candidates for the same office are arranged in a horizontal line, and the keys representing the candidates for the different offices of the same party or ticket are arranged in a vertical line. Should, therefore, a voter wish to vote a straight ticket, he has only to pull down the handles of the lever 4 at the top of the machine, which carried down the vertically-sliding bar 5, connected to said lever, as described. The inclined planes 11 in said vertically-sliding bar 5 engage the beveled projections 16 on the sides of all the voting-keys 13 in that line, and as said vertically-sliding bar 5 goes down all of the voting-keys 13 in that line are depressed, and the units-disk connected with each of said depressed keys is turned one tooth or one number, as described. The voter has thus voted a straight ticket, and he emerges from the booth and registers his poll-vote and releases the voting-keys by pushing the release-bar-operating rod 25 in presence of the election judges, as hereinbefore specifically described. Should, however, the next voter wish to vote a split ticket, he does not operate the levers 4, but depresses by hand the voting-keys which represent his candidates in the several tickets. He then steps to the release-bar-operating key and registers his poll-vote and releases the depressed keys, as before described. When one of the voting-keys is pushed in, the pawl 21 engages the ratchet-teeth 15 on the bottom of said key and hold said key in this position. The release-bar-operating rod 25 revolves the vertically eccentrically pivoted flat bar 23, which draws the release-bars 10, connected thereby, in the direction of the release-bar-operating rod 25. This takes the pawls 21 out of engagement with the ratchet-teeth 15 of the voting-keys 13 and allows them to spring back to their normal position. Under the release-bar 18, which connects with the release-bar-operating rod 25, I provide a spiral spring 59, connected to the bottom release-bar guide 17, which draws said release-bar-operating rod 25 back to its normal condition after having been operated by a voter.

Having thus described the several parts of my invention, I do not wish to be understood as limiting myself to exact construction as herein set forth, as various slight changes might be made therein by those skilled in the art which would fall within the limit and scope of my invention, as I consider myself entitled to all such changes.

I claim—

1. In a voting-machine, the combination of the voting-keys, disks connected thereto, vertically-sliding bars adapted to operate said voting-keys, levers adapted to operate said vertically-sliding bars, release-bars adapted to release said voting-keys, a vertical eccentrically-pivoted bar adapted to operate said release-bars, pawls on said release-bars, a release-bar-operating rod adapted to operate said vertical eccentrically-pivoted bar, a key secured to said rod, disks adapted to be operated by said key, a release-key, a pawl secured thereon adapted to release said key secured to said rod, substantially as described.

2. In a voting-machine, the combination of the voting-keys, disks, vertically-sliding bars, release-bars, a release-bar-operating rod extending from the machine and adapted to be operated by the voter, whereby the mechanism is reset, and a release-key for said release-bar-operating rod, adapted to be operated by the election judge, whereby the resetting of the voting mechanism is controlled by the said election judge, substantially as described.

3. In a voting-machine, the combination of the voting-keys, disks connected thereto, a locking means, release-bars for said keys, a release-bar-operating rod adapted to operate said release-bars, and extending a distance from the machine, said release-key also situated at a distance from the machine, whereby the entire poll-vote is registered, substantially as described.

4. In a voting-machine, the combination with vote-registering means, of a key adapted to be operated in presence of an election judge, and adapted to register the poll-vote, and a release-key adapted to be simultaneously operated by an election judge, whereby the aforementioned key operated by the voter is under the control of an election judge, substantially as described.

5. In a voting-machine the combination of the voting-keys arranged in a series of vertical lines, a lever adapted to operate each line, a locking device, a release-bar-operating rod adapted to release said keys, and operated by the voter, and a release-key adapted to release said release-bar-operating rod and adapted to be operated by the election judge, whereby the resetting of the voting mechanism is under the control of the election judge, substantially as described.

6. In a voting-machine, the combination of vote-registering means, consisting of voting-keys and disks, and a poll-vote-registering means consisting of a rod, key and disks, said key being adapted to release said voting-keys and simultaneously register a poll-vote, said key being operated by the voter, and a release-key adapted to release said rod and key and operated by an election judge, substantially as described.

7. In a voting-machine, the combination of vote-registering means consisting of voting-keys and disks, means for releasing said voting-keys at a distance from the machine and operated by the voter, said releasing means being adapted to be controlled by an election judge, at a distance from the machine, substantially as described.

8. In a voting-machine, the combination of vote-registering means, consisting of voting-keys and disks, a poll-vote-registering means, consisting of a rod key and disks, a locking means for said poll-vote-registering means, and a release-key adapted to release said poll-vote-operating means when said release-key is depressed, substantially as described.

9. In a voting-machine the combination of vote-registering means adapted to be operated by the voter, a poll-vote-registering means adapted to be operated by the voter in presence of an election judge, and means for controlling said poll-vote-registering means, adapted to be operated by an election judge, substantially as described.

10. In a voting-machine, the combination of vote-registering means consisting of voting-keys and disks and adapted to be operated by the voter, a poll-vote-registering means consisting of a key, rod and disks adapted to be operated by the voter in presence of an election judge, and means for releasing said poll-vote-registering means, adapted to be operated by an election judge, substantially as described.

In testimony whereof I affix my signature in presence of two witnesses.

HUGH A. ADAMS.

Witnesses:
CLAUDE D. STITT,
JOHN H. DICLAW.